(12) United States Patent
Fukui

(10) Patent No.: US 8,357,470 B2
(45) Date of Patent: Jan. 22, 2013

(54) ORGANIC SOLID ELECTROLYTE AND SECONDARY BATTERY

(75) Inventor: Ikuo Fukui, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 846 days.

(21) Appl. No.: 11/808,680

(22) Filed: Jun. 12, 2007

(65) Prior Publication Data

US 2007/0287069 A1  Dec. 13, 2007

(30) Foreign Application Priority Data

Jun. 12, 2006 (JP) ................................. 2006-161883

(51) Int. Cl.
*H01M 10/0565* (2010.01)
*H01M 6/18* (2006.01)

(52) U.S. Cl. ......... 429/306; 429/189; 429/309; 429/314

(58) Field of Classification Search .................. None
See application file for complete search history.

(56) References Cited

U.S. PATENT DOCUMENTS

| 4,303,748 A | | 12/1981 | Armand et al. | |
|---|---|---|---|---|
| 4,522,902 A | * | 6/1985 | Minchak et al. | 429/252 |
| 5,204,428 A | * | 4/1993 | Kobayashi et al. | 526/298 |
| 5,641,590 A | | 6/1997 | Sato et al. | |
| 2002/0114997 A1 | * | 8/2002 | Lee et al. | 429/314 |
| 2005/0271939 A1 | | 12/2005 | Xu et al. | |

FOREIGN PATENT DOCUMENTS

| EP | 0 757 397 | | 2/1997 |
|---|---|---|---|
| JP | 2-56870 A | | 2/1990 |
| JP | 3-74419 A | | 3/1991 |
| JP | 4-363869 A | | 12/1992 |
| JP | 9-50824 A | | 2/1997 |
| JP | 10-95811 A | | 4/1998 |
| JP | 2000-294284 A | | 10/2000 |
| JP | 2003-317540 A | | 11/2003 |
| JP | 2003317540 A | * | 11/2003 |

* cited by examiner

*Primary Examiner* — Keith Walker
(74) *Attorney, Agent, or Firm* — Birch, Stewart, Kolasch & Birch, LLP

(57) ABSTRACT

An organic solid electrolyte comprises a polymer obtained by (co)polymerization of cyanoethyl acrylate and/or cyanoethyl methacrylate, the polymer being doped with an inorganic ion salt. The electrolyte has a high ionic conductivity and is based on a hydroxyl-free polymer so that it may be used to construct a secondary battery which eliminates the risk of gas evolution.

3 Claims, No Drawings

ORGANIC SOLID ELECTROLYTE AND SECONDARY BATTERY

CROSS-REFERENCE TO RELATED APPLICATION

This non-provisional application claims priority under 35 U.S.C. §119(a) on Patent Application No. 2006-161883 filed in Japan on Jun. 12, 2006, the entire contents of which are hereby incorporated by reference.

TECHNICAL FIELD

This invention relates to a solid electrolyte having a high ionic conductivity for use in batteries, electrochromic devices, sensors, actuators and the like, and more particularly, to an organic solid electrolyte comprising a polymer obtained by (co)polymerization of a cyano-containing monomer(s), and a secondary battery comprising the same.

BACKGROUND ART

Batteries or cells, especially secondary batteries now draw a greater attention. They are used in a wider variety of applications including mobile phones, portable video cameras, portable computers, and electric automobiles. In particular, lithium ion secondary batteries are used in these applications because they are superior in voltage and energy density to traditionally available batteries using aqueous electrolytic solution such as Ni-MH batteries, Ni—Cd batteries, and $H_2SO_4$—Pb batteries. The lithium ion secondary batteries, however, suffer from safety problems of potential ignition or explosion because organic electrolyte solutions are used.

On the other hand, studies have been made on batteries not using electrolytic solution, that is, batteries using electrolytes in the form of ion-conductive solids. One exemplary electrolyte is polyethylene oxide having lithium perchlorate dissolved therein as described in U.S. Pat. No. 4,303,748 or JP-A 2-56870. This electrolyte, however, cannot be used in practice because of insufficient ionic conductivity and a high contact resistance with positive and negative electrodes. Nevertheless, since then, active efforts have been devoted for the research of ion-conductive polymers.

As compared with inorganic materials, organic materials have advantages including a low specific gravity, easy molding, and easy formation of flexible thin film. In general, solid electrolytes including solid polymer electrolytes (SPE) must meet some requirements, (1) moldability, (2) high ionic conductivity, and (3) safety, i.e., inertness to electrochemically active material. Importance is given in the order of (2), (3) and (1). The organic materials under investigation in the art are mostly polyethylene derivatives because of the course of research described above, and further include dielectrics, such as polyvinylidene fluoride and polyacrylonitrile having additives added thereto and exhibiting a conductivity σ of $10^{-7}$ to $10^{-5}$ S/cm. Although these prior art polymers were expected to be applied to batteries as organic solid electrolyte, they did not fully meet the above requirements to a sufficient extent to find practical battery and other applications. For example, polyethylene oxide derivatives have the problem of crystallization at low temperature. Most dielectrics are not regarded as having a high permittivity (or dielectric constant), as demonstrated by a relative permittivity of 9.2 for polyvinylidene fluoride and a relative permittivity of 8.0 for polyacrylonitrile. They do not contain a large amount of electrolyte, with a smaller number of carrier ions being available. Solid electrolytes having a high ionic conductivity were not available.

JP-A 4-363869 describes that dielectrics having cyano groups are applicable as the solid electrolyte. This patent discloses polymers in the form of polyvinyl alcohol, polysaccharides and derivatives thereof which are substituted with cyanoethyl groups. They exhibit a relatively high ionic conductivity in a system comprising lithium ions. U.S. Pat. No. 5,641,590 or JP-A 9-50824 discloses a gel electrolyte comprising a cyano-containing dielectric, which also exhibits a relatively high ionic conductivity in a system comprising lithium ions. These cyano-containing dielectrics satisfy requirement (1) to a full extent and requirement (2) to a certain extent, but requirement (3) of inertness to electrochemically active material to a short extent. These cyano-containing dielectrics are derived from base polymers having hydroxyl groups by substituting cyanoethyl groups for the hydroxyl groups. It is difficult at the state-of-the-art to substitute cyanoethyl groups for the hydroxyl groups entirely, with a certain proportion of hydroxyl groups being left behind. When these cyano-containing dielectrics are used in lithium ion secondary batteries, inevitably gas evolves probably due to alcoholate reaction of hydroxyl groups with lithium ions.

Further, JP-A 3-74419 describes radical copolymers of vinyl ethers and cyanoethyl acrylate of formula (1) or cyanoethyl methacrylate of formula (2), both shown later. It is difficult to produce copolymers having a sufficient degree of polymerization.

DISCLOSURE OF THE INVENTION

An object of the invention is to provide an organic solid electrolyte which is inert to electrochemically active materials and has a high ionic conductivity, and a secondary battery comprising the same.

The inventor has found that using a compound containing cyano groups, but not hydroxyl groups as the organic material to construct an organic solid electrolyte, an organic solid electrolyte which exhibits a satisfactory ionic conductivity and is inert to electrochemically active materials is produced.

In one aspect, the invention provides an organic solid electrolyte comprising a polymer obtained by polymerization or copolymerization of a monomer having the following formula (1) and/or a monomer having the following formula (2), the polymer being doped with an inorganic ion salt.

Preferably, the polymer comprises the monomer of formula (1) and the monomer of formula (2) in a molar ratio from 100:0 to 50:50. Also preferably, the inorganic ion salt comprises at least one inorganic ion salt containing lithium element.

In another aspect, the invention provides a secondary battery comprising a positive electrode, a negative electrode, and the organic solid electrolyte disposed therebetween.

BENEFITS OF THE INVENTION

The organic solid electrolyte of the invention has a high ionic conductivity. When this electrolyte is used in a secondary battery, for example, the resulting secondary battery substantially eliminates the risk of gas evolution because the electrolyte is based on a hydroxyl-free polymer. The invention is thus of great worth in the industry.

DESCRIPTION OF THE PREFERRED EMBODIMENTS

The organic solid electrolyte of the invention comprises a cyano-containing polymer which has a very high relative permittivity, as compared with organic materials comprising ordinary polymers, and is effective in relaxing the electrostatic energy of inorganic ions. This promotes dissociation of the electrolyte and enables to dope with a large proportion of inorganic ion salt. The resulting organic solid electrolyte thus has a high ionic conductivity.

Specifically, a polymer is produced by polymerization or copolymerization of a monomer having the following formula (1) and/or a monomer having the following formula (2). The polymer has a viscosity of 30 to 8,000 mPa·s at 20° C. as measured at a concentration of 20 wt % in dimethylformamide solvent.

  (1)

  (2)

More specifically, the polymer is produced through radical polymerization of a monomer of formula (1) and/or a monomer of formula (2) with the aid of a radical polymerization initiator. The radical polymerization initiator may be any of commonly used initiators and selected from, for example, azo compounds such as 2,2'-azobisisobutyronitrile, 2,2'-azobis(2,4-dimethylvaleronitrile), and 2,2'-azobis-2-methylbutyronitrile, and peroxide catalysts such as benzoyl peroxide.

Since the polymer should have cyano groups in its molecular structure, the preferred radical polymerization initiators are azo compounds having a nitrile group. The amount of polymerization initiator added is 0.005 to 0.02 in molar ratio relative to the total moles of the monomers. If the amount of polymerization initiator added is below the range, then polymerization may not proceed fully because of deactivation of radicals. If the amount of polymerization initiator added is beyond the range, then the control of polymerization reaction may become difficult, and the resulting polymer may have such a high degree of polymerization as to interfere with subsequent use, for example, the polymer becomes insoluble in solvents.

For controlling the polymerization reaction, a chain transfer agent such as lauryl mercaptan may also be used. The amount of chain transfer agent added is 0.05 to 1.0 in molar ratio relative to the moles of the polymerization initiator. If the amount of chain transfer agent added is below the range, then there may arise problems, for example, difficult control of polymerization reaction, depending on the amount of polymerization initiator added. If the amount of chain transfer agent added is beyond the range, polymerization reaction may not proceed fully.

Polymerization may be performed by prior art well-known techniques such as bulk polymerization, solution polymerization, suspension polymerization, and emulsion polymerization. In the event of solution polymerization, the polymerization solvent used is not particularly limited, provided that the monomers can be dissolved in the solvent and the solvent does not interfere with polymerization reaction. Examples of the polymerization solvent include acetone, N,N'-dimethylformamide, esters, and ethers. When the purifying step following polymerization reaction is taken into account, a solvent which is miscible with a crystallization solvent and with water is preferred. In this regard, acetone and N,N'-dimethylformamide are preferred. The concentration of monomer(s) in the polymerization solvent is not particularly limited. In the case of solution polymerization, however, polymerization reaction may not proceed fully if the concentration of monomer(s) in the polymerization solvent is too thin. Thus a concentration of at least 10 wt % is preferred. When no polymerization solvent is used, the polymerization is bulk polymerization.

A homopolymer of cyanoethyl acrylate of formula (1) tends to have a high relative permittivity and a low softening temperature whereas a homopolymer of cyanoethyl methacrylate of formula (2) tends to have a lower relative permittivity and a higher softening temperature than the cyanoethyl acrylate homopolymer. It accounts for the difference of relative permittivity that when a comparison is made between cyanoethyl acrylate and cyanoethyl methacrylate as the monomer, cyanoethyl acrylate has a higher content in molecule of cyanoethyl group or bipolar group than cyanoethyl methacrylate. With respect to the softening temperature, it is well known that when a comparison is made between an acrylate homopolymer and a methacrylate homopolymer, the methacrylate homopolymer has a higher softening temperature. This is also true to polymers of cyanoethyl monomers.

It is believed that the polymer functions as an ion-conductive solid electrolyte by virtue of the cyanoethyl group or bipolar group. It is thus believed that a polymer having a higher relative permittivity has a higher ionic conductivity. Too high a softening temperature may lead to a solid electrolyte layer having poor flexibility during drive, failing to provide stable performance. For this reason, the polymer is preferably derived from the monomers of formulae (1) and (2) in a molar ratio from 100:0 to 50:50, and more preferably from 90:10 to 50:50. If a molar ratio of units derived from formula (2) is higher than the range, the polymer may have a higher softening temperature and a lower relative permittivity.

The organic solid electrolyte of the invention is arrived at by doping the polymer described above with an inorganic ion salt. The inorganic ion salt is not particularly limited provided that it is used in ordinary electrochemical devices as the ion conductive metal salt. The inorganic ion salt contains at least one element selected from among Li, Na, K, Cs, Ag, Cu, and Mg. Illustrative examples of the inorganic ion salt include $LiClO_4$, LiI, LiSCN, $LiBF_4$, $LiAsF_5$, $LiCF_3SO_3$, $LiPF_4$, NaI, NaSCN, NaBr, $NaPF_5$, KI, KSCN, $KPF_5$, $KAsF_5$, CsSCN, $CsPF_5$, $AgNO_3$, $CuC_{12}Mg(ClO_4)_2$, $Rb_4I_{1.75}Cl_{3.25}$, $Li(CF_3SO_2)_2N$, $Li(C_2F_5SO_2)_2N$, $Li(CF_3SO_2)_2C$, and $Li(C_2F_5SO_2)_3C$, alone or in admixture of two or more.

The amount of inorganic ion salt added is preferably 0.01 to 50% by weight, more preferably 0.1 to 30% by weight based on the weight of the polymer. If the amount of inorganic ion salt added is below the range, too low an ion concentration may fail to provide a practically acceptable conductivity. If the amount of inorganic ion salt added is beyond the range, superfluous ions which can be no more dissolved in the polymer will precipitate out.

The method of doping at least one polymer with the inorganic ion salt is not particularly limited. For example, at least one of polymers and copolymers and the inorganic ion salt are mixed and dissolved in a solvent such as acetone to form a uniform solution, which is applied and dried to form a film. Alternatively, at least one of polymers and copolymers and the inorganic ion salt are mechanically kneaded at room temperature or at elevated temperature. Any of these and other methods may be selected. In the case of film formation by the solution method, a solid electrolyte film may be formed by heating under a reduced pressure. In another version of the solution method, the components may be dissolved in a liquid electrolyte used in ordinary lithium ion secondary cells, for example, non-aqueous liquid electrolytes such as ethylene carbonate, propylene carbonate, dimethyl carbonate, diethyl carbonate, methylethyl carbonate, and γ-butyrolactone. In this event, a solid electrolyte film may be produced by heating the solution under vacuum for evaporation to dryness. Alternatively, an appropriate amount of the solvent may be left in the film so as to increase the amount of ion-conductive metal salt dissolved in the polymer or to improve the mobility of metal ions dissolved in the polymer.

Similar effects are achieved by adding a non-aqueous liquid electrolyte to a solid electrolyte film following drying for impregnating the film with an appropriate amount of the non-aqueous liquid electrolyte. It is known that general polymers like polyesters have a high volume resistivity of at least $10^{15}$ Ω-cm. Even though polyvinylidene fluoride having a relatively high relative permittivity has a volume resistivity of about $10^{14}$ Ω-cm, the polymer of the invention has a low volume resistivity of about $10^{12}$ Ω-cm. Thus, when the polymer of the invention is used as the material of which positive and negative electrodes are composed, the advantage of reduced contact resistance of electrodes is expectable.

Next, the secondary battery of the invention is described.

The secondary battery of the invention comprises the organic solid electrolyte disposed between positive and negative electrodes.

The positive electrode comprises an active material, examples of which include, but are not limited to, metal compounds such as $CuO$, $Cu_2O$, $Ag_2O$, $CuS$, $CuSO_2$, $TiS$, $SiO_2$, $SnO$, $V_2O_5$, $V_6O_{13}$, $VO_x$, $Nb_2O_5$, $Bi_2O_3$, $CrO_3$, $Cr_2O_3$, $MoO_3$, $MoS_2$, $WO_3$, $SeO_2$, $MnO_2$, $Mn_2O_4$, $Fe_2O_3$, $FeO$, $Fe_3O_4$, $Ni_2O_3$, $NiO$, and $CoO_2$, and electroconductive polymers such as polypyrrole and polyacene.

Active materials used in the negative electrode include, but are not limited to, alkali metals, alkali alloys, the compounds described above as the positive electrode active material, and carbonaceous materials. Preferred alkali metals and alkali alloys are lithium base ones such as Li, Li—Al, Li—Mg, and Li—Al—Ni. In preparing positive and negative electrodes, it is a common practice to add binders, conductive agents and other additives to the electrode-forming material. These additives are not particularly limited.

EXAMPLE

Examples of the invention are given below by way of illustration and not by way of limitation.

Example 1

A 500-ml three-necked flask equipped with a condenser and stirrer was purged with nitrogen and then charged with 70 g of 2-cyanoethyl acrylate monomer which had been distilled by a conventional vacuum distillation technique. To the flask, 163 g of dry acetone as the polymerization solvent and 2,2'-azobisisobutyronitrile as the free radical initiator in such an amount as to provide a molar ratio of 0.01 relative to the monomer were added, and 0.001 mole of lauryl mercaptan as the chain transfer agent added. A nitrogen inlet tube was connected to the flask, and the ingredients were allowed to react at a temperature of 60° C. for a time of 300 minutes. At the end of reaction, the reaction solution was cooled to room temperature, and poured into an excess volume of methanol for precipitation. The procedure of dissolving the precipitate in acetone and pouring into an excess volume of methanol was repeated several times. The precipitate thus worked-up was dried, yielding about 63 g of poly(2-cyanoethyl acrylate) having a viscosity of 305 mPa·s at 20° C. as measured at a concentration of 20 wt % in dimethylformamide, a relative permittivity of about 18 at 40° C. and 1 kHz, and a softening temperature of about 30° C.

The poly(2-cyanoethyl acrylate), 2 g, was dissolved in 10 g of acetone, to which was added 0.8 g of $LiClO_4$ in 3 g of acetone, followed by intimate mixing. The solution was cast on a Teflon® plate and allowed to stand at room temperature for 24 hours, during which time an excess of the solvent was removed. The wet film was dried under reduced pressure at 60° C. for 24 hours, yielding an ion-conductive solid electrolyte film of about 50 μm thick. The film was transparent and had $LiClO_4$ uniformly distributed therein.

A disk of 10 mm diameter was cut out of the film and sandwiched between a pair of stainless steel plates to form an electrode. An ionic conductivity was determined by using an AC impedance meter or multifrequency LCR meter Model 4192A (Yokogawa-Hewlett-Packard Co., Ltd.) at a frequency of 5 Hz to 5 MHz, and computer-processing complex impedance measurements. It showed an ionic conductivity of $1.1 \times 10^{-3}$ S/cm at 25° C.

A positive electrode was prepared by mixing $LiCoO_2$ and Ketjen Black in a weight ratio of 90:1 to form a mix, and mixing this mix with a solution of 2 g poly(2-cyanoethyl acrylate) in 10 g acetone in a weight ratio of 1:2. The resulting mixture was cast on a positive electrode collector plate of aluminum and heat dried in a nitrogen atmosphere. A negative electrode was prepared by pressure bonding metallic lithium to a stainless steel collector plate.

The ion conductive solid electrolyte film was sandwiched between the positive and negative electrodes. The laminate was heat pressed at 80° C. in a nitrogen atmosphere to compress the solid electrolyte film to a thickness of 25 μm.

The secondary cell thus fabricated was placed in a pressure resistant can of stainless steel, which was purged with nitrogen and sealed under atmospheric pressure. The cell was charged with a current flow at 0.1 mA/cm² until a cell voltage of 4.2 V was reached and discharged with a current flow at 0.1 mA/cm² until a cell voltage of 2.75 V was reached. The charge/discharge operation was repeated 300 cycles, after which no increase of the internal pressure within the can was found.

Example 2

The procedure was the same as in Example 1 except that 73.92 g of a mixture of 2-cyanoethyl acrylate monomer and 2-cyanoethyl methacrylate monomer in a molar ratio of 1:1 was used. There was obtained about 66 g of a copolymer having a viscosity of 355 mPa-s at 20° C. as measured at a concentration of 20 wt % in dimethylformamide, a relative permittivity of about 15 at 40° C. and 1 kHz, and a softening temperature of about 50° C.

The subsequent procedure was the same as in Example 1 except that the copolymer was used. The ionic conductivity was $0.9 \times 10^{-3}$ S/cm at 25° C. In the cell test as in Example 1, no increase of the internal pressure within the can was found.

Comparative Example 1

Evaluation was made as in Example 1 except that a cyanoethylated polyvinyl alcohol (CR-V by Shin-Etsu Chemical Co., Ltd.) was used as the ion conductive polymer. The cyanoethylated polyvinyl alcohol has a relative permittivity of about 23 at 40° C. and 1 kHz and a softening temperature of about 30° C. and contains about 20 mol % of hydroxyl groups within a molecule.

The ionic conductivity was as low as $8\times10^{-5}$ S/cm at 25° C. In the cell test as in Example 1, the internal pressure within the can showed an increase of about 5%.

Japanese Patent Application No. 2006-161883 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organic solid electrolyte in the form of a dried film to be disposed between a positive electrode and a negative electrode of a secondary battery, said organic solid electrolyte comprising an inorganic ion salt and a polymer obtained by copolymerization, in a molar ratio of from 90:10 to 50:50, of a monomer having the following formula (1) and a monomer having the following formula (2):

$$CH_2=CHCOO-(CH_2)_2-CN \qquad (1)$$

$$CH_2=C(CH_3)COO-(CH_2)_2-CN \qquad (2)$$

said organic solid electrolyte being prepared by mixing and dissolving of the polymer and the inorganic ion salt in a solvent to dope the polymer with the inorganic ion salt, and heating the mixture under a reduced pressure to remove the solvent and form the dried film.

2. The organic solid electrolyte of claim 1, wherein said inorganic ion salt comprises at least one inorganic ion salt containing a lithium element.

3. A secondary battery comprising a positive electrode, a negative electrode, and the organic solid electrolyte of claim 1 disposed therebetween.

* * * * *